Oct. 26, 1926.
C. S. CRICKMER
1,604,443
RELIEF VALVE
Filed May 1, 1925
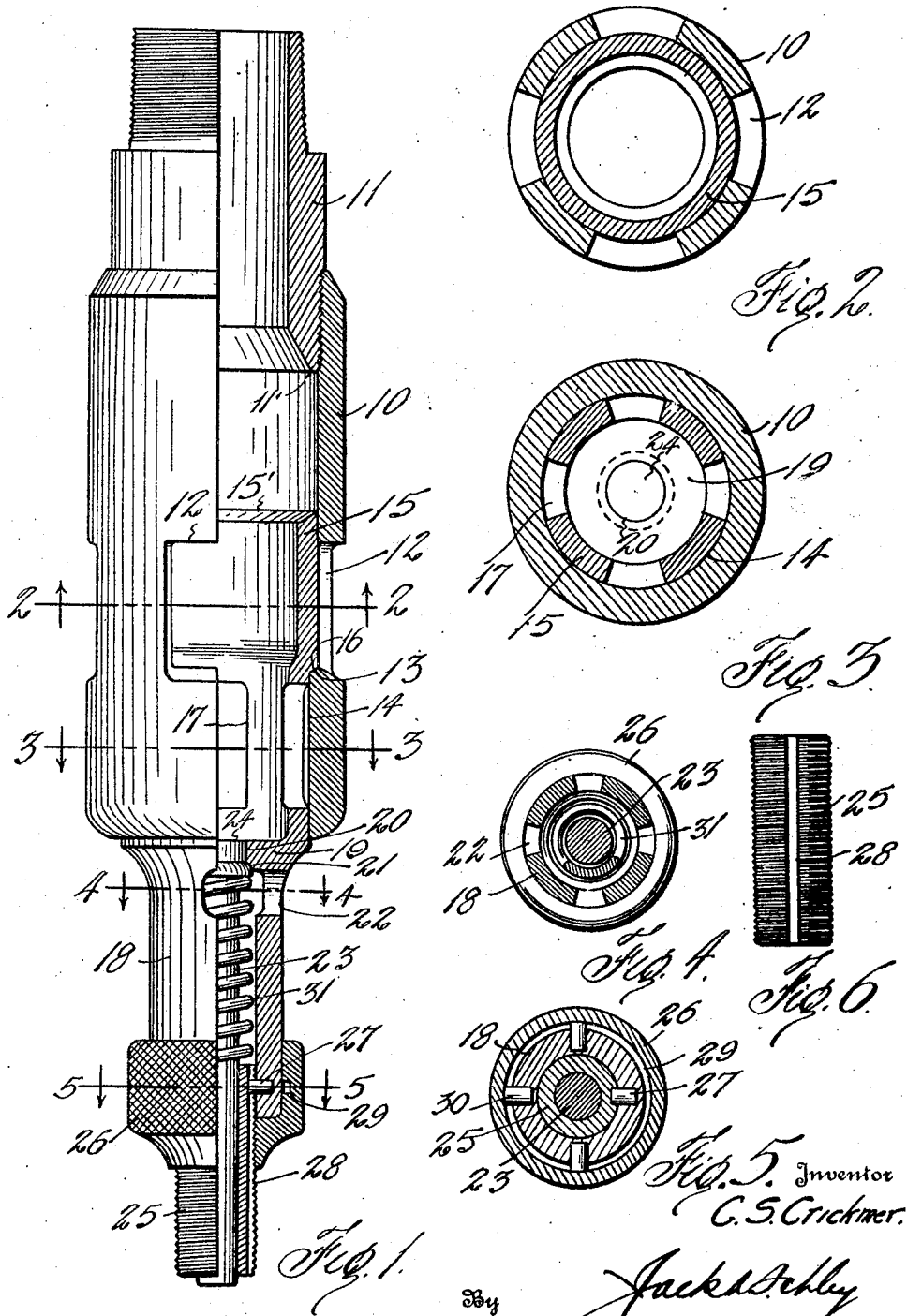
Inventor
C. S. Crickmer.
By Jack A. Sehley
Attorney Patented Oct. 26, 1926.                                           1,604,443

UNITED STATES PATENT OFFICE.

CHARLES S. CRICKMER, OF DALLAS, TEXAS, ASSIGNOR TO THE GUIBERSON CORPORATION, OF DALLAS, TEXAS, A CORPORATION OF DELAWARE.

RELIEF VALVE.

Application filed May 1, 1925. Serial No. 27,157.

This invention relates to new and useful improvements in relief valves.

The object of the invention is to provide a valve structure for use in wells where it is desired to elevate the fluid and to relieve the strain or surplus from the elevating medium after a maximum load has been collected, by discharging such surplus or excess below the valve.

A particular object of the invention is to provide a tension adjusting device which may be fastened against displacement and also which will not work loose and disengage itself from the valve.

A further object of the invention is to provide a piston type of valve, whereby amplified valve openings are obtained and a more rapid filling of the collecting medium secured.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a vertical view of a valve constructed in accordance with my invention, one half being in elevation and the other half in section, Fig. 2 is a cross-sectional view on the line 2—2 of Fig. 1, Fig. 3 is a cross-sectional view on the line 3—3 of Fig. 1, Fig. 4 is a cross-sectional view on the line 4—4 of Fig. 1, Fig. 5 is a cross-sectional view on the line 5—5 of Fig. 1, and Fig. 6 is an elevation of the bushing.

In the drawings the numeral 10 designates a tubular body or case having its upper end internally screw threaded to receive an adapter 11, or other coupling, whereby it may be attached to the tubular conductor (not shown) of a swab bailer or other liquid elevating medium used in a well. Near its central portion the body has a plurality of valve openings 12 spaced circumferentially and occupying a considerable area, whereby a large volume of liquid may pass into the body in a short period of time.

Contiguous to the bottom of the openings 12 I provide an annular bevelled valve seat 13 and the body below the seat has a counter bore 14. A piston valve in the form of a sleeve 15 is turned to have a snug sliding fit in the main and counter bores of the body and has an annular bevelled shoulder 16 for engaging on the seat 13. In its reduced portion below the shoulder the sleeve has vertical openings 17 spaced to register with the openings 12 when the sleeve is raised, but closed when the shoulder rests upon the seat.

The sleeve extends through the lower end of the body and is merged into a reduced tubular shank 18 depending therefrom. The sleeve is separated from the shank by a transverse web 19 having a circular guide opening 20 at its center. The lower edge of the opening is faced off to form a valve seat 21. Just below the valve seat the shank has radial valve openings 22. A valve stem 23 passes up through the shank and has a shouldered circular valve 24 at its upper end engaging in the guide opening 20 and contacting with the seat 21.

The stem has a sliding fit in an elongated bushing 25 at its lower end. The bushing is screw threaded and is engaged in an adjusting ring 26 rotatably confined on the lower end of the shank which it surrounds. The shank carries a radial key 27 engaging in a vertical keyway or channel 28 in the bushing. The ring has its upper portion enlarged to engage around the shank and is provided with an internal annular groove 29 receiving radial pins 30 carried by the shank.

The stem 23 is spaced from the shank and is surrounded by a coiled spring 31 supported at its lower end upon the bushing 25 and in turn supporting at its upper end, the valve 24. It will be seen that the pins 30 support the ring 26 for free rotation on the shank, but prevent its displacement therefrom. When the ring is rotated its threaded connection with the bushing 25, will cause the latter to undergo longitudinal adjustment because of the key 27 and keyway 28. The adjustment of the bushing will either increase or decrease the compression of the spring 31 and consequently vary its tension accordingly.

In using the valve the ring nut 26 is rotated to longitudinally adjust the bushing 25 and thereby place the spring under the desired tension. As the function of the spring is to hold the valve 24 to its seat 21 until a maximum load is sustained and then yield, the required tension of the spring may be determined in any suitable way, such as by subjecting the valve 24 to a pressure equal to the load to be sustained.

Normally the parts are in the position shown in Fig. 1 and the openings 12 and 17 are closed so that no liquid can enter. On the down stroke of the valve the resistance offered by the liquid in the well retards the downward passage of the valve sleeve 15 and shank 18 with the body 10; thus the sleeve 15 will be relatively elevated in the body and bring the openings 12 and 17 into registration. The upward movement of the sleeve or relative downward movement of the body will be limited by the engagement of the upper edge 15' of the sleeve with the lower edge 11' of the adapter 11.

As the downward passage of the valve is continued the liquid flows in large volume through the registered openings 12 and 17 and up through the parts 15, 10 and 11. On the up stroke of the valve the weight of the liquid in the body 10 and valve sleeve 15 will force the sleeve downward until the shoulder 16 engages on the seat 13 and the openings 12 and 17 are closed. If the column of liquid which has been collected above the valve exceeds the maximum required, the load on the valve 24 will overcome the tension of the spring 31, thus displacing the valve 24 downwardly and compressing the spring. The surplus of liquid will pass down through the opening 20 and escape through the openings 22. When the load is relieved to the point where the tension of the compressed spring predominates, the valve 24 will be closed and a maximum but not excessive load may be elevated.

It is pointed out that the ring 26 jambs against the lower edge of the shank 18 and is not likely to loosen, but if it should it cannot become disengaged from the shank and the parts are not likely to be lost in the well. The upper edge 15' of the valve sleeve 15 may be bevelled to offer less resistance to an upward movement and also to provide a scraping edge for removing paraffin and other deposits from the inner wall of the body. The sleeve 15 should have a close fit in the bores of the body to prevent excessive by-passing of the liquid or lodgment of sand and the like.

Various changes in the size and shape of the different parts, as well as modifications and alterations may be made within the scope of the appended claims.

What I claim, is:

1. In a relief valve device, a movable cylindrical body having radial openings extending through its sides and provided with a bore, an annular valve seat in the body below the openings thereof, a piston valve slidable in the bore of the body and having a seat engaging shoulder, the valve having an imperforate portion above its shoulder for closing the body openings when the valve is seated, and provided with openings below its shoulder for registering with the body openings when the valve is raised from its seat, a spring pressed relief valve carried by the piston valve, and means for varying the tension on the spring pressed valve.

2. In a relief valve device, a movable exterior valve body having a pipe coupling at its upper end, a valve seat in the body, a piston valve engaging the seat in the body and having openings below its seating portion, that portion of the piston valve below its seat having a snug sliding fit in the body, whereby its said openings are normally closed, the piston valve having an internal valve seat, a shank depending from the piston valve below the lower end of the body, said shank and the bottom of the piston valve being open to engage with a fluid when the device is lowered thereto, a relief valve engaging the internal seat in the piston valve and having a stem in the shank, tension means for normally holding the relief valve closed, and exteriorly located adjusted means connected with the tension means and carried by the shank.

3. In a relief valve device, a tubular body having radial valve openings therethrough, a valve member slidable in the bore of the body and having radial valve openings therethrough adapted to register with the body openings, but normally located below said body openings, and a spring sustained downwardly opening relief valve carried by the valve member, said body openings being closed when said valve member is seated.

4. In a relief valve device, a tubular body having valve openings in its side walls, a tubular valve sliding in the body and having valve openings in its side walls for registering with the valve openings of the body, means in the body for supporting the valve with its openings out of registration with the body openings and closed, a stem depending from the valve, and a spring-sustained downwardly opening relief valve carried by the valve.

5. In a relief valve device, a tubular body having valve openings and an annular valve seat below the openings, a valve sleeve having openings for registering with the openings of the body and also having an annular shoulder for engaging the seat of the body to normally position the said openings below the body openings, a stem depending from the valve sleeve, a second valve seat between the stem and sleeve, a relief valve engaging said second seat, and variable tension means for supporting said relief valve.

6. In a relief valve device, a tubular body having spaced openings in its sides, an annular valve seat in the body, which is counter bored below said valve seat, a piston valve sleeve having a snug sliding fit in the bores of the body and provided with an annular shoulder engaging said seat, the sleeve having openings for registering with the openings of the body and spaced below said body openings when the shoulder and seat are engaged, a tubular shank depending from the piston valve, a web between the shank and valve having an opening, a relief valve seating upwardly in said opening, a stem depending in the shank from the relief valve, and variable tension means for supporting said relief valve.

7. In a relief valve device, a tubular body having spaced openings in its sides, an annular valve seat in the body, which is counter bored below said seat, a piston valve sleeve having a snug sliding fit in the bores of the body and provided with an annular shoulder engaging said seat, the sleeve having openings for registering with the openings of the body and spaced below said body openings when the shoulder and seat are engaged, a tubular shank depending from the piston valve, a web between the shank and valve having an opening, a relief valve seating upwardly in said opening, a stem depending in the shank from the relief valve, the shank having an outlet below the relief valve, a coiled spring supported on the stem and engaging the relief valve, a bushing slidable on the stem and supporting said spring, and an adjusting member rotatably confined on the shank and having screw threaded engagement with the bushing.

8. As a sub-combination in a relief device, a piston valve, a tubular shank depending from the valve, a web between the shank and the valve having an opening, a relief valve seating upwardly in said opening, the shank having openings below the web, a stem depending from the relief valve in the shank, a bushing slidable on the lower end of the stem, a coiled spring surrounding the stem between the bushing and the relief valve, the bushing having a longitudinal keyway and being screw threaded, an adjusting ring internally screw threaded for engagement with the threads of the bushing, a key carried by the ring and engaging in the keyway of the bushing, the ring having an internal groove, and radial projections carried by the shank engaging in the groove of the ring.

In testimony whereof I affix my signature.

CHARLES S. CRICKMER.